United States Patent
Faruque et al.

(10) Patent No.: US 10,207,614 B1
(45) Date of Patent: Feb. 19, 2019

(54) RESETTABLE ARMREST BRACKET, ARMREST MOUNTING SYSTEM AND METHOD OF MITIGATING INJURY IN EVENT OF A SIDE IMPACT

(71) Applicant: FORD GLOBAL TECHNOLOGIES, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/675,503

(22) Filed: Aug. 11, 2017

(51) Int. Cl.
*B60N 2/75* (2018.01)
*B60J 5/04* (2006.01)
*B60N 2/42* (2006.01)
*B60R 13/02* (2006.01)

(52) U.S. Cl.
CPC ............ *B60N 2/78* (2018.02); *B60N 2/777* (2018.02); *B60J 5/0461* (2013.01); *B60N 2/4235* (2013.01); *B60R 13/0243* (2013.01)

(58) Field of Classification Search
CPC .......... B60N 2/78; B60N 2/763; B60N 2/777; B60N 2/787
USPC .............. 296/1.09, 153; 297/411.2, 411.21, 297/411.37, 411.45
See application file for complete search history.

(56) References Cited

U.S. PATENT DOCUMENTS

| | | | |
|---|---|---|---|
| 7,121,611 B2 | 10/2006 | Hirotani et al. | |
| 7,503,621 B2 | 3/2009 | Mani | |
| 7,654,597 B1* | 2/2010 | Farooq | B60J 5/04 296/1.09 |
| 7,661,751 B2 | 2/2010 | Gokhale et al. | |
| 9,233,660 B1 | 1/2016 | Farooq et al. | |
| 2004/0100136 A1* | 5/2004 | Bornchen | B60N 2/763 297/411.21 |
| 2007/0108830 A1 | 5/2007 | Hessler et al. | |
| 2009/0045663 A1 | 2/2009 | Tamakoshi et al. | |
| 2009/0134660 A1* | 5/2009 | Pinkerton | B60N 2/4235 296/146.7 |
| 2009/0200831 A1 | 8/2009 | Motowski et al. | |
| 2010/0096901 A1 | 4/2010 | Benkler et al. | |
| 2016/0096454 A1 | 4/2016 | Roychoudhury | |

FOREIGN PATENT DOCUMENTS

| | | | | |
|---|---|---|---|---|
| DE | 10307481 | * | 9/2004 | ............ B60N 2/777 |
| FR | 2747627 | * | 7/1998 | ............ B60N 2/777 |
| FR | 2749233 | * | 8/1998 | ............ B60N 2/777 |

* cited by examiner

*Primary Examiner* — Dennis H Pedder
(74) *Attorney, Agent, or Firm* — Vichit Chea; King & Schickli, PLLC

(57) ABSTRACT

An armrest mounting system includes an armrest having at least one projecting mount, a door inner including an inner margin defining an armrest accommodation feature and at least one resettable armrest bracket carried on the door inner and engaging the at least one projecting mount extending through the armrest accommodation feature. A related method of mitigating an injury in the event of a side impact is also disclosed.

15 Claims, 7 Drawing Sheets

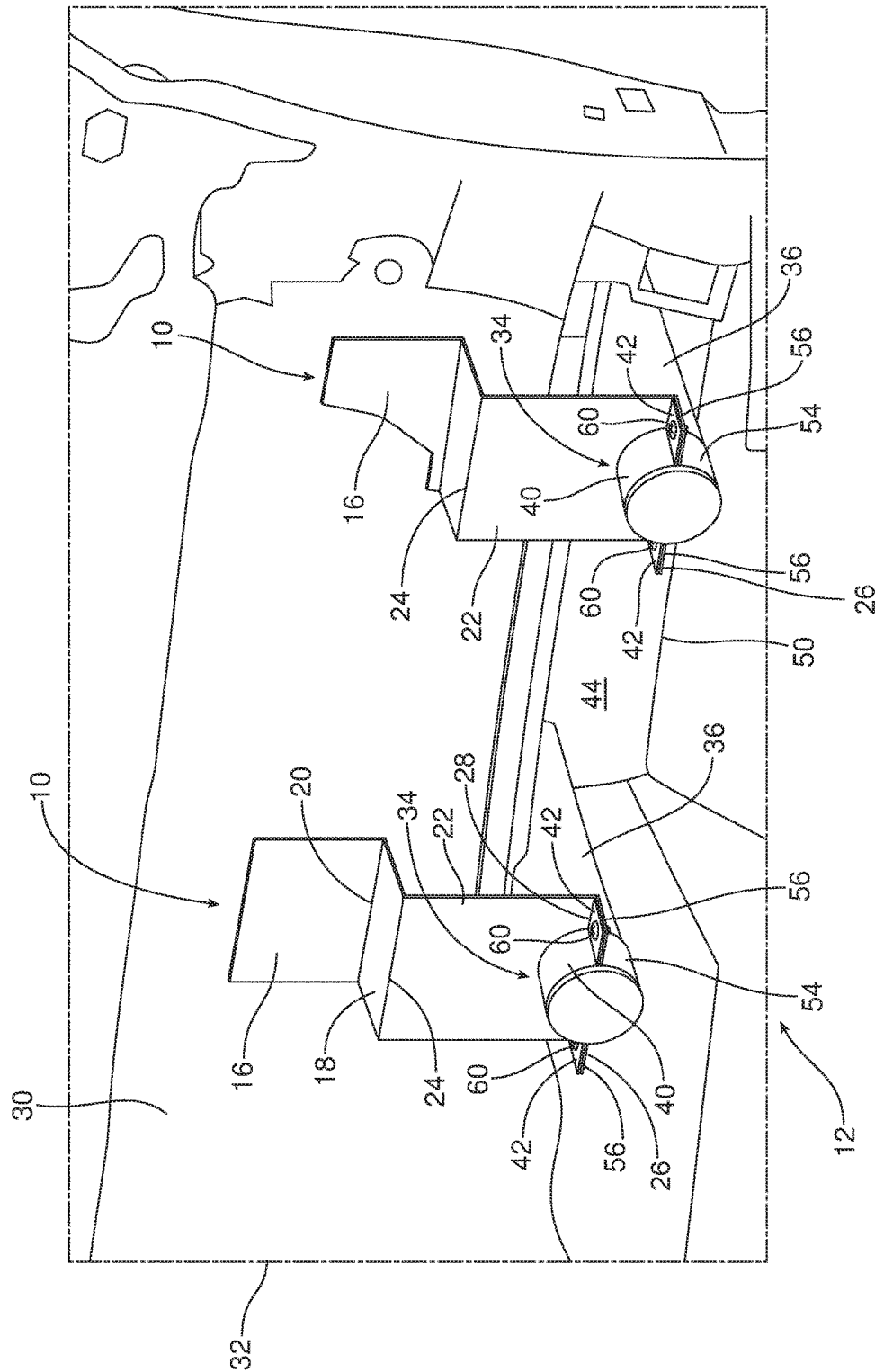

RESETTABLE ARMREST BRACKET, ARMREST MOUNTING SYSTEM AND METHOD OF MITIGATING INJURY IN EVENT OF A SIDE IMPACT

TECHNICAL FIELD

This document relates generally to the motor vehicle equipment field and, more particularly, to a new and improved resettable armrest bracket, an armrest mounting system incorporating that resettable armrest bracket and a resulting method of mitigating injury in the event of a side impact.

BACKGROUND

In a side impact, the door of a motor vehicle being impacted generally bows inboard, intruding into the passenger compartment. In the event the impact force is sufficient, the intrusion may be significant. As illustrated in FIG. 1, the armrest A is generally aligned with the ribs R of the occupant O. The armrest A is generally stiff and may cause high rib deflections and rib injury when a side impact causes a significant inboard intrusion of the armrest into the ribs R of the occupant O.

This document relates to a new and improved resettable armrest bracket and an armrest mounting system incorporating that resettable armrest bracket that are adapted or configured to mitigate rib injury otherwise possible due to a side impact causing intrusion of the door and the armrest carried thereon into the passenger compartment and the ribs of the motor vehicle occupant.

SUMMARY

In accordance with the purposes and benefits described herein, a resettable armrest bracket is provided. That resettable armrest bracket comprises a body including a first segment connected to a second segment by a first bend. The second segment is connected to a third segment by a second end. The third segment is connected to a fourth segment by a third bend. The first segment forms a door inner abutment and the fourth segment forms an armrest support.

The resettable armrest bracket further includes a receiver to receive and hold a mount projecting from an armrest. The fourth segment may comprise the receiver. In some embodiments that receiver may form a first half socket.

In accordance with an additional aspect, an armrest mounting system comprises an armrest, a door inner and at least one resettable armrest bracket. The armrest includes at least one projecting mount. The door inner includes an inner margin defining an armrest accommodation feature. The at least one resettable armrest bracket is carried on the door inner and engages the at least one projecting mount extending through the armrest accommodation feature.

The door inner may further include an inboard face and an outboard face. The armrest may be displaceable in response to a side impact or lateral load from a home position on an inboard side of the door inner to an injury mitigation position extending at least partially through the armrest accommodation feature to an outboard side of the door inner.

The at least one resettable armrest bracket may have a first segment forming a door inner abutment fixed to the door inner and a receiver to receiver and hold the at least one projecting mount. The at least one resettable armrest bracket may also have a second segment connected to the first segment by a first bend. Further, the at least one resettable armrest bracket may have a third segment connected to the second segment by a second bend. In addition, the at least one resettable armrest bracket may have a fourth segment connected to the third segment by a third bend. The fourth segment may comprise the receiver. That receiver may comprise a first half socket.

The at least one projecting mount may include a second half socket and a mounting lug or rod. The second half socket may extend partially around that rod.

The first half socket may include a first set of opposed flanges. The second half socket may include a second set of opposed flanges complementary to the first set of opposed flanges. A fastening feature may be provided for securing the first set of opposed flanges with the second set of opposed flanges. That fastening feature may comprise screw fasteners or other appropriate means.

In accordance with yet another aspect, a method is provided for mitigating injury in event of a side impact. That method comprises the steps of: (a) mounting an armrest on a resettable armrest bracket fixed to a door inner, (b) incorporating an armrest accommodation feature into the door inner and (c) displacing the armrest through the armrest accommodation feature from a home position inboard the door inner to an injury mitigation position at least partially outboard of the door inner in response to the side impact.

The method may further include the step of incorporating a resilient bend line into the resettable armrest bracket and bending the resettable armrest bracket about that resilient bend line to guide displacement of the armrest through the armrest accommodation feature in the door inner. In addition, the method may include the step of returning the armrest to the home position upon release of the lateral load produced by the side impact. This is done by the resilient spring action of the resettable armrest bracket.

In the following description, there are shown and described several preferred embodiments of the resettable armrest bracket, the armrest mounting system incorporating that resettable armrest bracket and the related method of mitigating injury in the event of a side impact. As it should be realized, the resettable armrest bracket, the armrest mounting system and the related method are capable of other, different embodiments and their several details are capable of modification in various, obvious aspects all without departing from the resettable armrest bracket, armrest mounting system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the resettable armrest bracket, armrest mounting system and related method of mitigating injury in the event of a side impact and together with the description serve to explain certain principles thereof.

FIG. 4b is a detailed perspective view illustrating the resettable armrest brackets on the outboard face of the door inner when the armrest is in the home position illustrated in FIG. 4a.

FIG. 5b is a view similar to FIG. 4b but illustrating the armrest in the injury mitigation position as shown in FIG. 5a.

Reference will now be made in detail to the present preferred embodiments of the resettable armrest bracket and the armrest mounting system, examples of which are illustrated in the accompanying drawing figures.

DETAILED DESCRIPTION

Figure 4A:
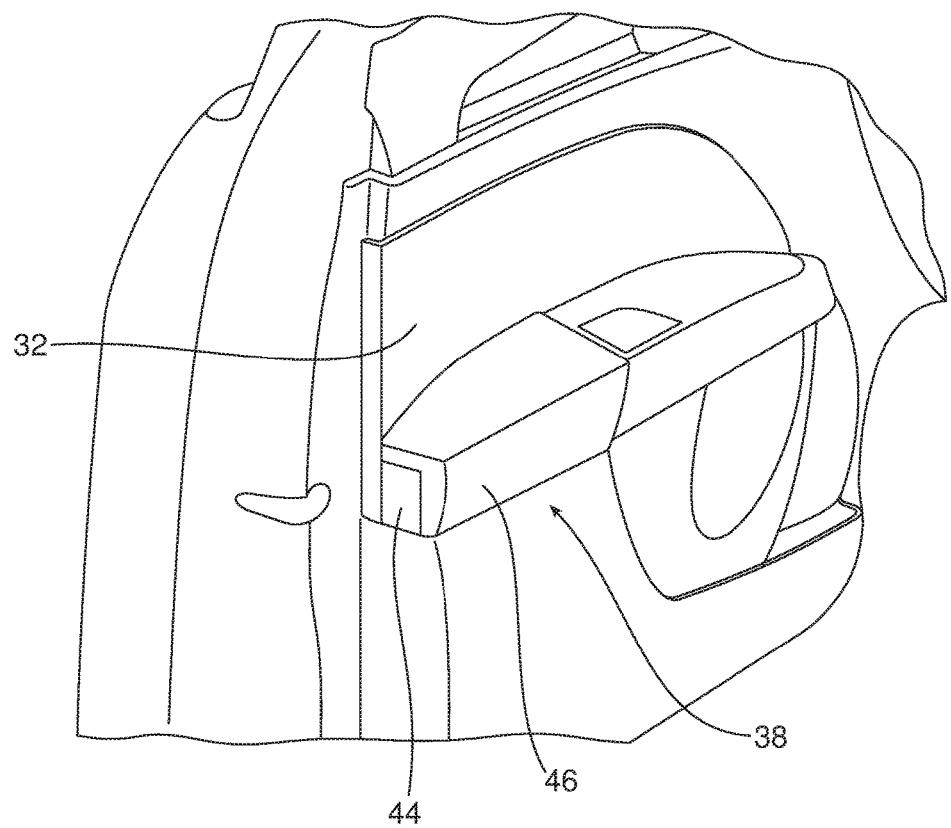
FIG. 4a is a detailed perspective view illustrating the armrest on the door in a home position.
Figure 5A:
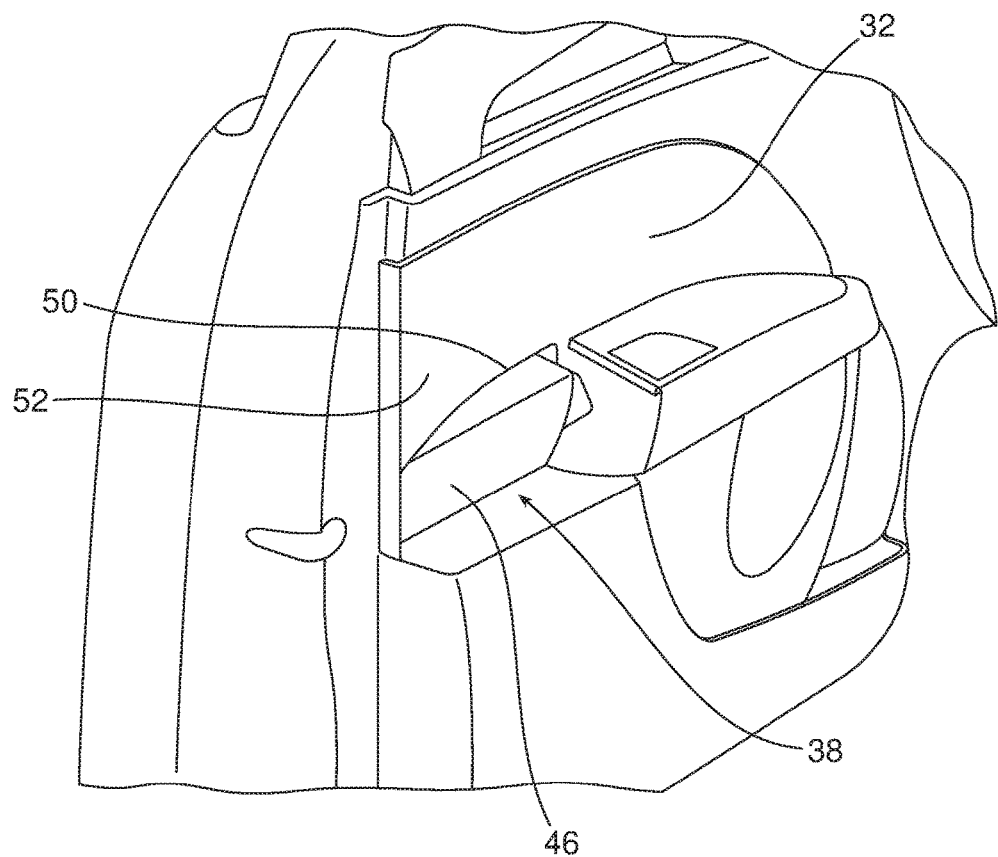
FIG. 5a is a detailed perspective view illustrating the armrest in the injury mitigation position in response to a lateral load input due to a side impact.
Figure 5B:
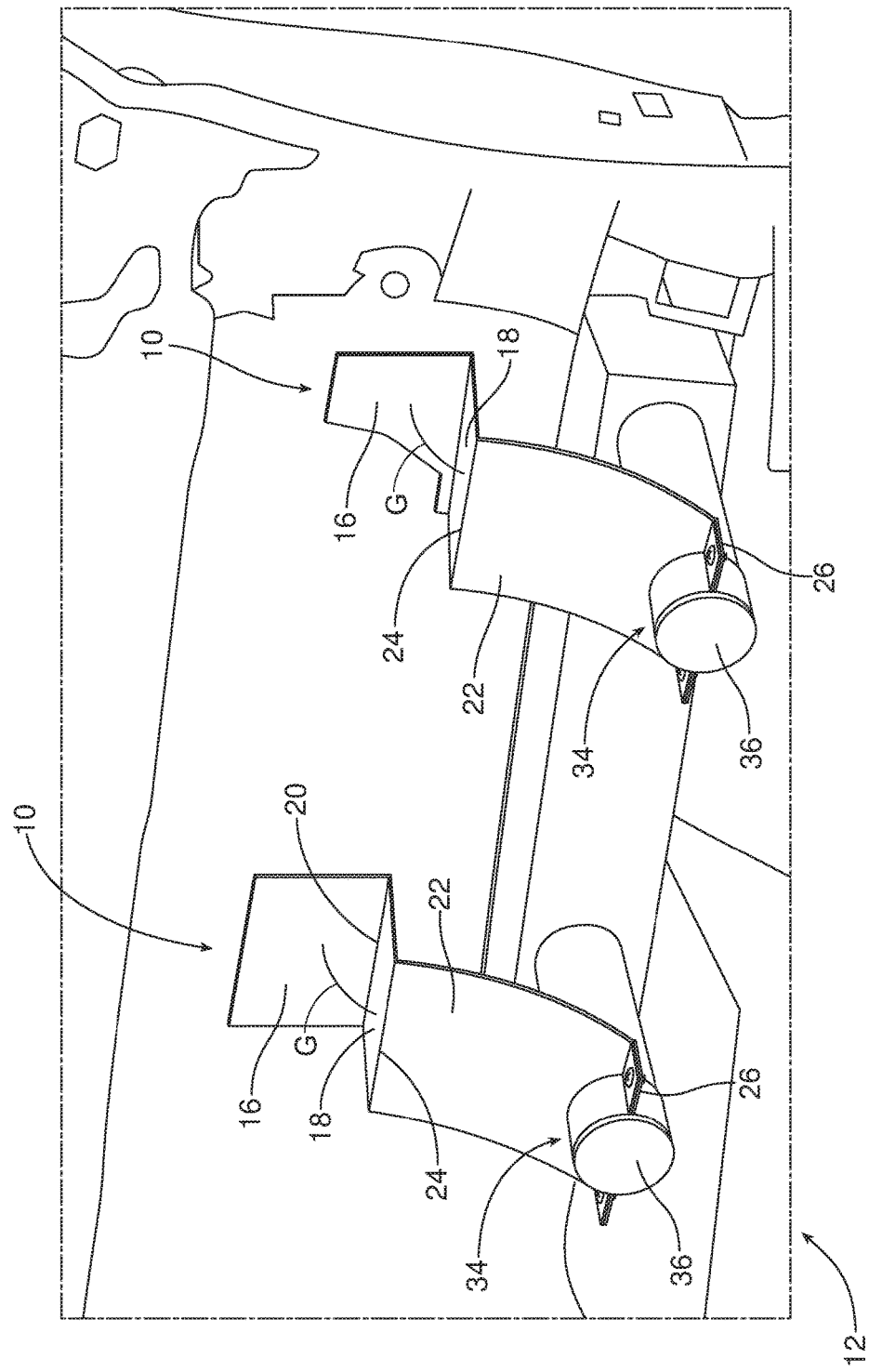

Reference is now made to FIGS. 2, 3, 4a, 4b, 5a and 5b illustrating the resettable armrest bracket 10 and the armrest mounting system 12 incorporating that resettable armrest bracket. As best illustrated in FIGS. 4b and 5b, the resettable armrest bracket 10 has a first segment 16 connected to a second segment 18 by a first resilient bend 20. The second segment 18 is connected to a third segment 22 by a second bend 24. The third segment 22 is connected to a fourth segment 26 by a third bend 28.

As further illustrated, the first segment 16 forms a door inner abutment that may be welded or otherwise connected to the outboard face 30 of the door inner 32. The fourth segment 26 may form an armrest support.

More specifically, the fourth segment 26 of the resettable armrest bracket 10 may further comprise a receiver 34 to receive and hold a mount 36 projecting from an armrest 38. In the illustrated embodiment, the receiver 34 forms a first half socket 40 between a first set of opposed flanges 42.

The resettable armrest bracket 10 may be made from various half strength steels of grades such as HSLA250 or HSLA350. Alternatively, the resettable armrest brackets 10 may be made from other steel grades, aluminum and even certain types of plastics which provide the desired operating characteristics. Generally, the operating characteristics of the resettable armrest bracket 10 may be tuned as desired by adjusting the length of the first segment 16, and the gauge and type of material from which the body 14 is constructed in order to ensure that the bracket deformation remains in the elastic range when subjected to lateral loads associated with a side impact.

Figure 1:
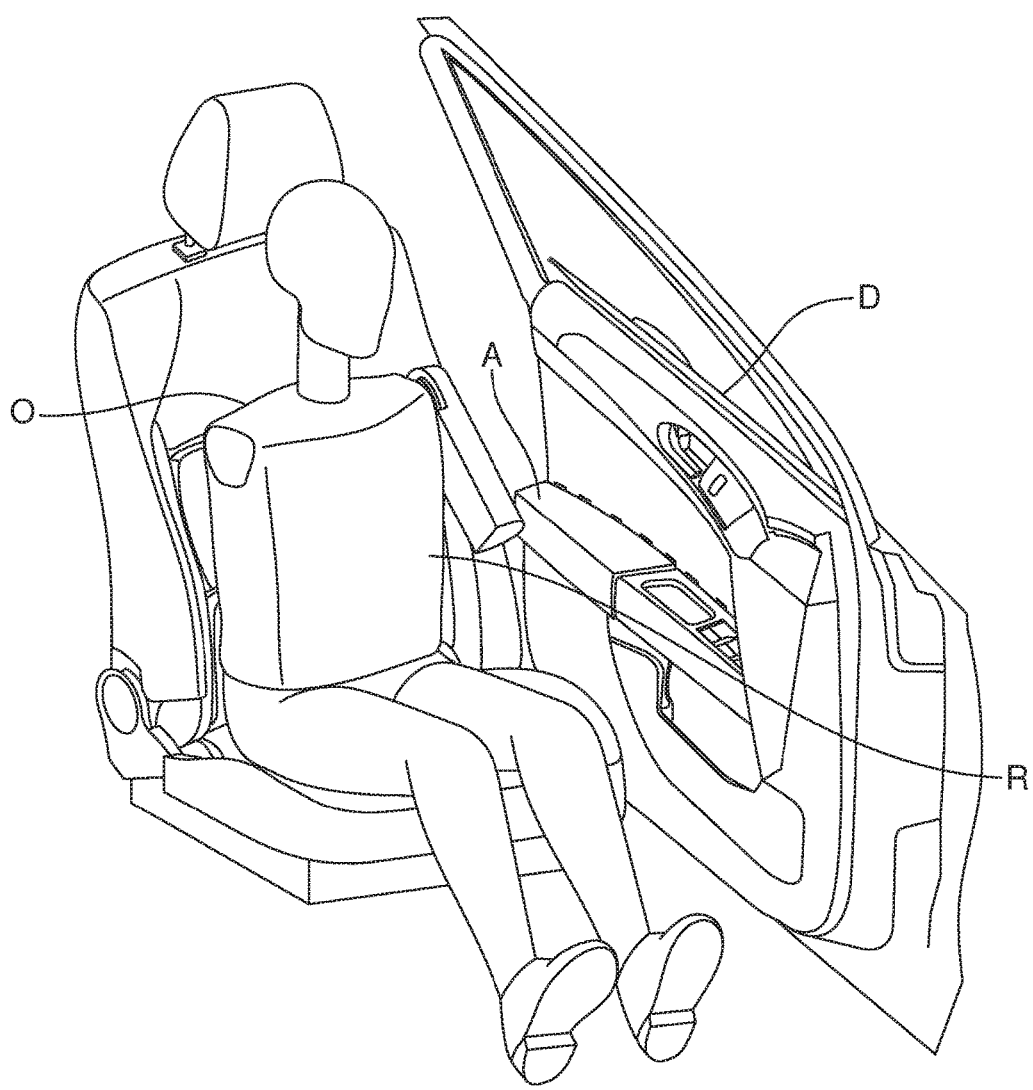
FIG. 1 is a perspective view illustrating the orientation of the door and armrest with respect to a motor vehicle occupant showing how the armrest is aligned with the ribs of the occupant.
Figure 2:
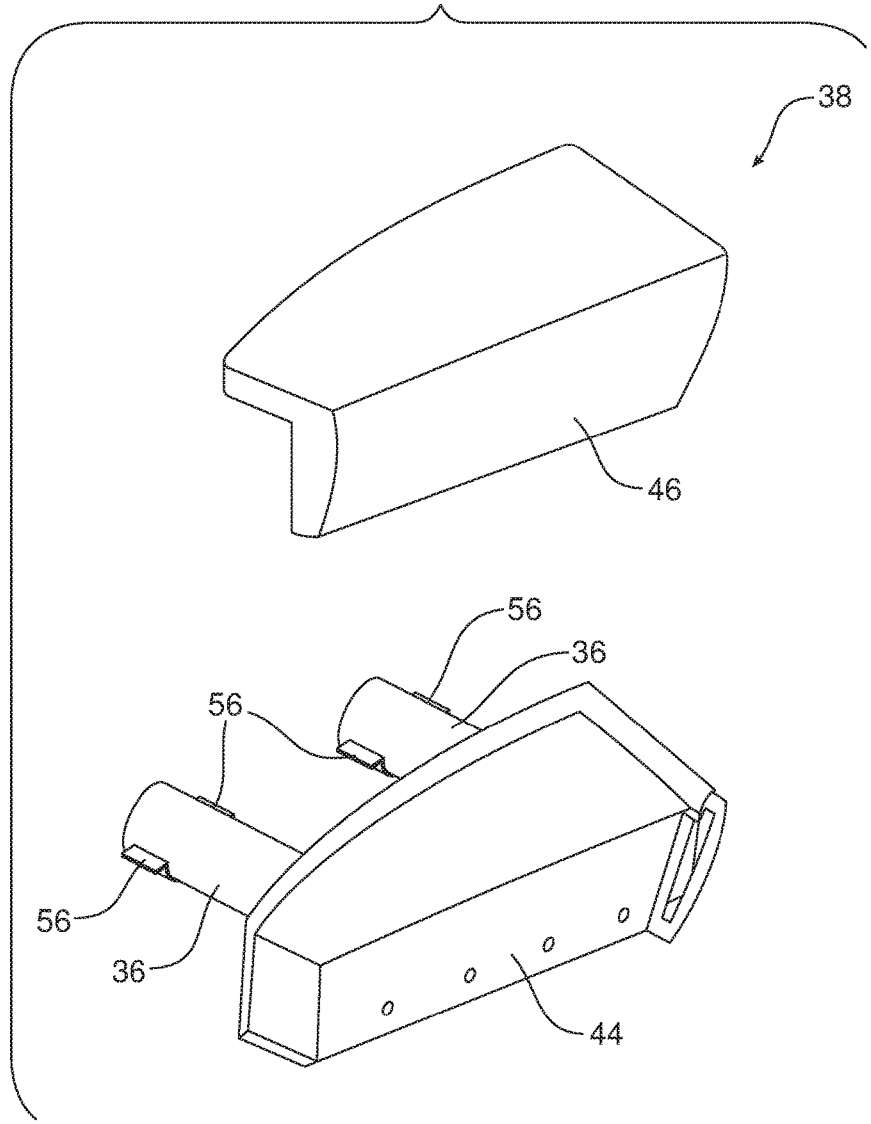
FIG. 2 is a partially exploded detailed perspective view of the armrest.
Figure 3:
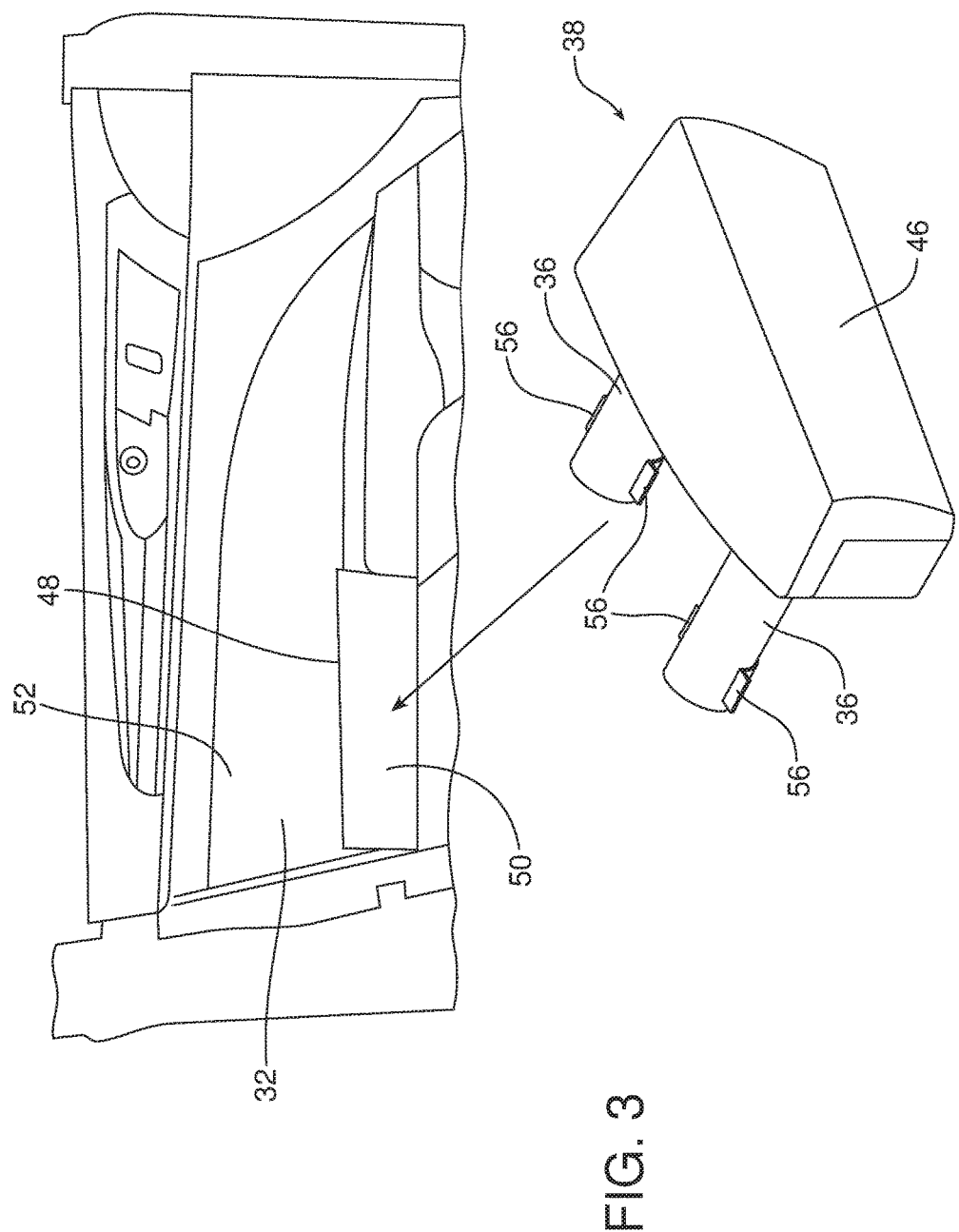
FIG. 3 is a partially exploded perspective view illustrating that the armrest is mounted on the door in alignment with an armrest accommodation feature provided in the door inner.

As illustrated in FIG. 2, the armrest 38 may comprise a stiff, compressible core 44 which provides strength. The core 44 is covered by a relatively soft outer layer 46 which provides the desired tactile feel for the armrest. At least one mount 36 projects from the core 44 of the armrest 38. In the illustrated embodiment, two mounts 36 are shown in the form of lugs or rods.

The armrest mounting system 12 is best illustrated in FIGS. 3, 4a, 4b, 5a and 5b. The armrest mounting system 12 of the illustrated embodiment includes the armrest 38 and the two projecting mounts 36. The armrest mounting system 12 also includes a door inner 32 including an inner margin 48 defining an armrest accommodation feature 50. In the illustrated embodiment, the armrest accommodation feature 50 comprises an aperture through which the armrest 38 may be displaced during a side impact. In addition, the armrest mounting system 12 of the illustrated embodiment includes two resettable armrest brackets 10 configured to engage and hold the two projecting mounts 36.

The two resettable armrest brackets 10 are both carried on the door inner 32 by securing the first segments 16 thereof to the inner margin 48 of the door inner 32 above the armrest accommodation feature 50. As will be described in greater detail below the two resettable armrest brackets 10 engage the two projecting mounts 36 that extend through the armrest accommodation feature 50.

As best illustrated in FIGS. 4a, 4b and 5a and 5b, the door inner 32 includes an inboard face 52 in addition to the outboard face 30. As will become apparent from the following description, the armrest 38 is displaceable in response to a side impact from a home position on the inboard side of the door inner 32 as illustrated in FIGS. 4a and 4b to an injury mitigation position extending at least partially through the armrest accommodation feature 50 in the door inner to an outboard side of the door inner as best illustrated in FIGS. 5a and 5b.

Toward this end, the first segment 16 of each resettable armrest bracket 10 forms a door inner abutment fixed to the inner margin 48 along the outboard face 30 of the door inner 32. Further, each resettable armrest bracket 10 includes the receiver 34 to receive and hold one of the mounts 36 projecting from the armrest 38.

More specifically, as best illustrated in FIGS. 2 and 4b, each projecting mount 36 includes a second half socket 54 between a second set of opposed flanges 56. The second half socket 54 extends partially around the rod. Thus, the first half socket or receiver 34 includes the first set of opposed flanges 42 while the second half socket 54 includes the second set of opposed flanges 56 complementary to the first set of opposed flanges. A fastening feature 60, such as screws or other means appropriate for the intended purpose, secure the first set of opposed flanges 42 to the second set of opposed flanges 56 and thus secure the armrest 38 to the door inner 32 by means of the resettable armrest brackets 10.

Consistent with the above description a method is provided of mitigating injury in the event of a side impact. That method comprises mounting the armrest 38 on the resettable armrest bracket 10 fixed to the door inner 32. Further, the method includes the step of incorporating the armrest accommodation feature 50 into the door inner 32. In addition, the method includes the step of displacing the armrest 38 through the armrest accommodation feature 50 from a home position inboard the door inner 32 as illustrated in FIGS. 4a and 4b to an injury mitigation position at least partially outboard the door inner as illustrated in FIGS. 5a and 5b in response to the side impact.

The method may further include the step of incorporating a resilient bend line into the resettable armrest bracket 10 and bending the resettable armrest bracket 10 about that resilient bend point to guide displacement of the armrest 38 through the armrest accommodation feature 50 in the door inner 32. In the illustrated embodiment, the resilient bend line is defined by the first resilient bends 20 of the two resettable armrest brackets. More specifically, those two resilient bends 20 are longitudinally aligned.

In the event the armrest 38 intrudes inboard and engages with the ribs R of the occupant O as a result of a side impact, the armrest 38 is deflected through the accommodation feature 50 from the home position to the injury mitigation position. During this displacement, the two resettable armrest brackets 10 bend about the first resilient bends 20 and the included angles G (see FIG. 5b) between the first segments 16 and the second segments 18 decrease. Once the lateral loading on the armrest 38 is released, the energy stored in the resettable armrest brackets 10, returns the armrest 38 back through the accommodation feature 50 to the home position inboard of the door inner 32. When this occurs, the included angles G are restored to their original value. Thus, it should be appreciated that the method may include the step of returning the armrest 38 to the home position upon release of the lateral load produced by the side impact.

In summary, numerous benefits and advantages are provided by the resettable armrest bracket 10 and the armrest mounting system 12 incorporating the resettable armrest bracket. The resettable armrest bracket 10 may be made of steel or other appropriate material having sufficient stiffness to support the required vertical load coming from the mount 36 while at the same time be able to bend in the elastic range (not yield) and absorb energy when the armrest 38 is pushed outboard when the armrest has been bowed inboard by a side impact into the ribs R of an occupant O. Once the loading is removed, the brackets 10 reset and return to their original positions thereby displacing the armrest 38 back to the home position from the injury mitigation position. The door inner 32 includes the armrest accommodation feature 50 comprising an aperture or cutout matching the periphery of the armrest. Thus, the armrest accommodation feature 50 allows the armrest to deflect outboard in order to mitigate injury.

Advantageously, the resettable armrest bracket 10 and armrest mounting system 12 provide a softer armrest stiffness in the lateral direction in the event of a side impact while meeting vertical load stability requirements. Advantageously, the armrest mounting system 12 resets itself after the side impact is over and, therefore, can be reused so as to reduce repair costs. Advantageously, the armrest mounting system 12 is more robust and repeatable than other breakable or collapsible armrest technology while still fully functioning to mitigate occupant lower rib injury in the event of a side impact.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A resettable armrest bracket; comprising:
a body including a first segment connected to a second segment by a first bend, said second segment connected to a third segment by a second bend and said third segment connected to a fourth segment by a third bend, said first segment forming a door inner abutment and said fourth segment forming an armrest support wherein said fourth segment includes a receiver to receive and hold a mount projecting from an armrest and said receiver is a first half socket.

2. An armrest mounting system, comprising:
an armrest including at least one projecting mount;
a door inner including an inner margin defining an armrest accommodation feature; and
at least one resettable armrest bracket carried on said door inner and engaging said at least one projecting mount extending through said armrest accommodation feature.

3. The armrest mounting system of claim 1, wherein said door inner includes an inboard face and an outboard face and said armrest is displaceable in response to a side impact from a home position on an inboard side of said door inner to an injury mitigation position extending at least partially through said armrest accommodation feature to an outboard side of said door inner.

4. The armrest mounting system of claim 3, wherein said at least one resettable armrest bracket has a first segment forming a door inner abutment fixed to said door inner and a receiver to receive and hold said at least one projecting mount.

5. The armrest mounting system of claim 4, wherein said at least one resettable armrest bracket has a second segment connected to said first segment by a first bend.

6. The armrest mounting system of claim 5, wherein said at least one resettable armrest bracket has a third segment connected to said second segment by a second bend.

7. The armrest mounting system of claim 6, wherein said at least one resettable armrest bracket has a fourth segment connected to said third segment by a third bend.

8. The armrest mounting system of claim 7, wherein fourth segment comprises said receiver.

9. The armrest mounting system of claim 8, wherein said receiver is a first half socket.

10. The armrest mounting system of claim 9, wherein said at least one projecting mount includes a second half socket and a rod, said second half socket extending partially around said rod.

11. The armrest mounting system of claim 10, wherein said first half socket includes a first set of opposed flanges and said second half socket includes a second set of opposed flanges complementary to said first set of opposed flanges.

12. The armrest mounting system of claim 11, further including a fastening feature securing said first set of opposed flanges with said second set of opposed flanges.

13. A method of mitigating injury in event of a side impact, comprising:
mounting an armrest on a resettable armrest bracket fixed to a door inner;
incorporating an armrest accommodation feature into said door inner; and
displacing said armrest through said armrest accommodation feature from a home position inboard said door inner to an injury mitigation position at least partially outboard of said door inner in response to said side impact.

14. The method of claim 13, further including incorporating a resilient bend line into said resettable armrest bracket and bending said resettable armrest bracket about said resilient bend line to guide displacement of said armrest through said armrest accommodation feature in said door inner.

15. The method of claim 14, further including returning said armrest to said home position upon release of lateral load produced by said side impact.

* * * * *